(12) United States Patent
Reed et al.

(10) Patent No.: US 7,344,189 B2
(45) Date of Patent: *Mar. 18, 2008

(54) SEAT ASSEMBLY WITH SELF POSITIONING HEAD RESTRAINT

(75) Inventors: Steven James Reed, Pickney, MI (US); Kevin John Ventura, Grosse Pointe, MI (US); Jacob Aaron Bentekoe, Linden, MI (US)

(73) Assignee: Intier Automotive Inc, Aurora, Ontario (CA)

( * ) Notice: Subject to any disclaimer, the term of this patent is extended or adjusted under 35 U.S.C. 154(b) by 537 days.

This patent is subject to a terminal disclaimer.

(21) Appl. No.: 10/380,185

(22) PCT Filed: Sep. 10, 2001

(86) PCT No.: PCT/US01/28269

§ 371 (c)(1),
(2), (4) Date: Jul. 7, 2003

(87) PCT Pub. No.: WO02/20306

PCT Pub. Date: Mar. 14, 2002

(65) Prior Publication Data

US 2005/0073180 A1 Apr. 7, 2005

(51) Int. Cl.
*A47C 1/02* (2006.01)
(52) U.S. Cl. .................... 297/61; 297/408; 297/378.14
(58) Field of Classification Search ............ 297/344.1, 297/61, 378.12, 378.14, 361.1, 354.12, 341, 297/408

See application file for complete search history.

(56) References Cited

U.S. PATENT DOCUMENTS

| 3,005,660 A | * | 10/1961 | Winick | ............... | 297/61 |
| 3,929,374 A | * | 12/1975 | Hogan et al. | ............... | 297/61 |
| 5,383,710 A | * | 1/1995 | Premji | ............... | 297/378.12 |
| 5,472,261 A | * | 12/1995 | Oplenskdal et al. | ........ | 297/342 |
| 5,482,349 A | * | 1/1996 | Richter et al. | ............... | 297/15 |
| 5,544,939 A | * | 8/1996 | Baret et al. | ............... | 297/340 |
| 5,558,403 A | * | 9/1996 | Hammoud et al. | .... | 297/378.12 |
| 5,681,079 A | * | 10/1997 | Robinson | ............... | 297/61 |
| 5,700,055 A | * | 12/1997 | Davidson et al. | ...... | 297/378.12 |

(Continued)

FOREIGN PATENT DOCUMENTS

FR 805 550 9/1959

(Continued)

*Primary Examiner*—David Dunn
*Assistant Examiner*—Erika Garrett
(74) *Attorney, Agent, or Firm*—Clark Hill PLC (57) ABSTRACT

A head restraint (20) having a front surface (22) for supporting the head of the occupant seated on the seat assembly (10) is pivotally coupled to the upper portion (15) of the seat back (12) and moveable relative to the seat back between a plurality of angled head supporting positions (A) and a forwardly folded stowed position (B) defined by the front surface (22) of the head restraint (20) being generally perpendicular to the front surface (17) of the seat back (12). The seat assembly further includes a mechanism operatively interconnecting the head restraint to the seat back for providing automatic and continuous pivotal movement of the head restraint between one of the head supporting positions and the stowed position in response to pivotal adjustment of the seat back between one of the reclined seating positions and the forwardly folded positions.

6 Claims, 5 Drawing Sheets

U.S. PATENT DOCUMENTS

| | | | |
|---|---|---|---|
| 5,738,411 A * | 4/1998 | Sutton et al. | 297/378.12 |
| 5,918,940 A * | 7/1999 | Wakamatsu et al. | 297/410 |
| 5,951,108 A * | 9/1999 | Bauer et al. | 297/378.12 |
| 6,007,153 A * | 12/1999 | Benoit et al. | 297/378.12 |
| 6,033,017 A * | 3/2000 | Elqadah et al. | 297/216.1 |
| 6,192,565 B1 * | 2/2001 | Tame | 297/61 |
| 6,328,381 B1 * | 12/2001 | Smuk | 297/365 |
| 6,390,558 B2 * | 5/2002 | Fischer et al. | 297/410 |
| 6,464,299 B1 * | 10/2002 | Castagna | 297/378.12 |
| 6,474,741 B2 * | 11/2002 | Kamida et al. | 297/378.12 |
| 6,485,096 B1 * | 11/2002 | Azar et al. | 297/61 |
| 6,709,058 B1 * | 3/2004 | Diffrient | 297/320 |
| 6,860,564 B2 * | 3/2005 | Reed et al. | 297/408 |

FOREIGN PATENT DOCUMENTS

JP    11-198697    7/1999

* cited by examiner

SEAT ASSEMBLY WITH SELF POSITIONING HEAD RESTRAINT

BACKGROUND OF THE INVENTION

1. Field of the Invention

The subject invention relates to a vehicle seat assembly having a self positioning head restraint assembly, and more particularly, to a self positioning head restraint assembly for automatically and continuously adjusting the angular position of a head restraint in response to pivotal movement of a seat back relative to a seat cushion.

2. Description of the Related Art

Automotive vehicles include vehicle seat assemblies for supporting an occupant in a vehicle. The seat assemblies comprise a seat cushion and a seat back, typically pivotally mounted to the seat cushion by a recliner mechanism. The seat back is often pivotal between a plurality of reclined seating positions and a forwardly folded flat position. The seat assemblies also commonly comprise a head restraint coupled to the seat back for supporting the seat occupant's head. Typically, the height or pivotal displacement of the head restraint may be adjusted, either manually or by power actuation, regardless of the position of the seat back.

It remains desirable to provide a mechanism for automatically and continuously adjusting the angular position of the head restraint relative to the seat back in response to the pivotal adjustment of the seat back.

SUMMARY OF THE INVENTION

The present invention relates to a seat assembly comprising a seat cushion having front and rear portions, and a seat back having upper and lower portions. The seat back is operatively connected at the lower portion to the rear portion of the seat cushion for pivotal movement relative to the seat cushion between a plurality of reclined seating positions and a forwardly folded flat position. The seat back further includes a front surface for supporting the back of an occupant seated on the seat assembly. A head restraint having a front surface for supporting the head of the occupant seated on the seat assembly is pivotally coupled to the upper portion of the seat back and moveable relative to the seat back between a plurality of angled head supporting positions and a forwardly folded stowed position defined by the front surface of the head restraint being generally perpendicular to the front surface of the seat back. The seat assembly further includes a mechanism operatively interconnecting the head restraint to the seat back for providing automatic and continuous pivotal adjustment of the head restraint to one of the head supporting positions in response to pivotal adjustment of the seat back to one of the reclined seating positions. The mechanism further provides automatic and continuous pivotal movement of the head restraint between one of the head supporting positions and the stowed position in response to pivotal adjustment of the seat back between one of the reclined seating positions and the forwardly folded positions.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
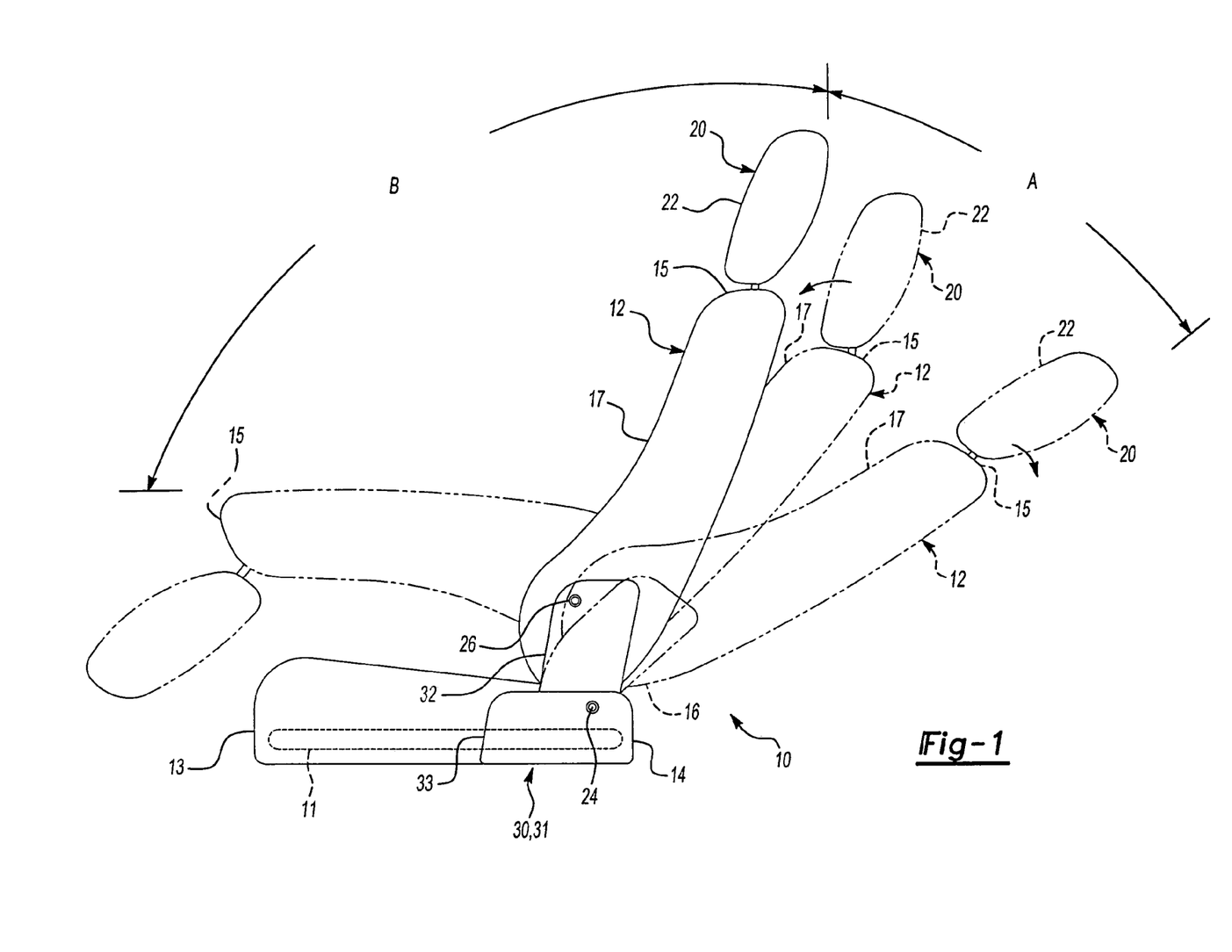
FIG. 1 is a schematic side view of an automotive seat assembly incorporating a self positioning head restraint assembly, according to the subject invention.

Referring to the Figures wherein like numerals indicate like or corresponding parts through the several views; FIG. 1 discloses a seat assembly 10 for use in an automotive vehicle. The seat assembly 10 includes a generally horizontal seat cushion assembly 11 and a seat back 12 assembly for supporting an occupant on the seat 10. The seat cushion 11 has opposite and spaced apart front and rear portions 13, 14. The seat back 12 has opposite and spaced apart upper and lower portions 15, 16. The seat back 12 further has a front surface 17 for supporting the back of an occupant supported in the seat assembly 10. The seat back 12 is operatively interconnected at its lower portion 16 to the rear portion 14 of the seat cushion 11 by a pair of synchronized recliner mechanisms 30, 31. The recliner mechanisms 30, 31 allow pivotal adjustment of the seat back 12 about a first pivot axis 24 between a plurality of reclined seating positions, as illustrated at A in FIG. 1. The recliner mechanisms 30, 31 further allows pivotal movement of the seat back 12 about a second pivot axis 26 from one of the reclined seating positions A to a forwardly folded flat position, as illustrated at B in FIG. 1. Described in detail below, the seat assembly 10 further includes a head restraint 20 operatively interconnected to the upper portion 15 of the seat back 12 and having a front surface 22 for supporting the head of an occupant.

Figure 2:
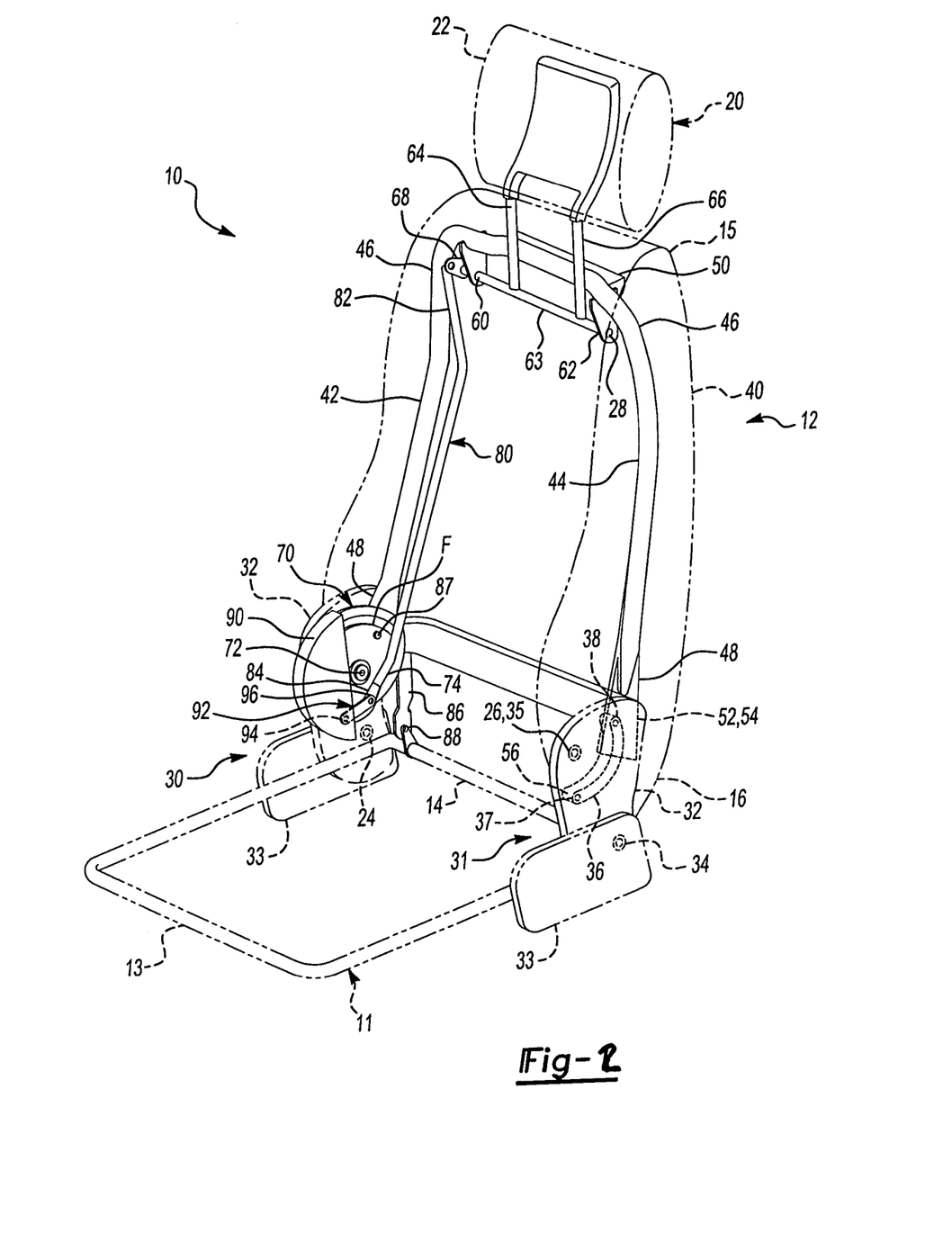
FIG. 2 is a perspective view of the seat assembly incorporating the self positioning head restraint assembly.

Referring to FIG. 2, the seat back 12 comprises a seat back frame 40 having spaced apart and generally parallel side members 42, 44. Each of the side members 42, 44 have opposite upper and lower ends 46, 48. An upper cross member 50 extends between the upper ends 46 of each of the side members 42, 44. First and second recliner brackets 52, 54 are fixedly attached to the lower ends 48 of each of the side members 42, 44, respectively, by any conventional means, such as welding or bolting. A dump pivot stop 56 extends outwardly from each of the first and second recliner brackets 52, 54.

Each of the recliner mechanisms 30, 31 include an upper portion 32 pivotally assembled to a lower portion 33 by a pivot pin 34, defining the first pivot axis 24. The upper portions 32 of each of the recliner mechanisms 30, 31 are pivotally assembled to the first and second recliner brackets 52, 54, respectively, by a pivot pin 35, thus defining the second pivot axis 26. The upper portions 32 of each of the recliner mechanisms 30, 31 further include an arcuate slot 36 for slidably guiding the dump pivot stops 56 of each of the first and second recliner brackets 52, 54, respectively. The arcuate slot 36 has first and second ends 37, 38 defining the range of travel for the seat back 12 when the seat back 12 is pivoted about the second pivot axis 26 between one of the reclined seating positions A and the forwardly folded-flat position B. The dump pivot stop 56 is releasably lockable against either of the first and second ends 37, 38 of the arcuate slot 36. Additionally, the upper portion 32 is selectively lockable with the lower portion 33 for allowing pivotal adjustment of the seat back 12 about the first pivot axis 24 in one of the reclined seating positions, wherein the dump pivot stop 56 is lockingly held against the first end 37 of the arcuate slot 36. Further detailed description and operation of the recliner mechanisms 30, 31 is fully set forth in U.S. Pat. No. 5,558,403 issued Sep. 24, 2000, which is incorporated herein by reference in its entirety.

Figure 3:
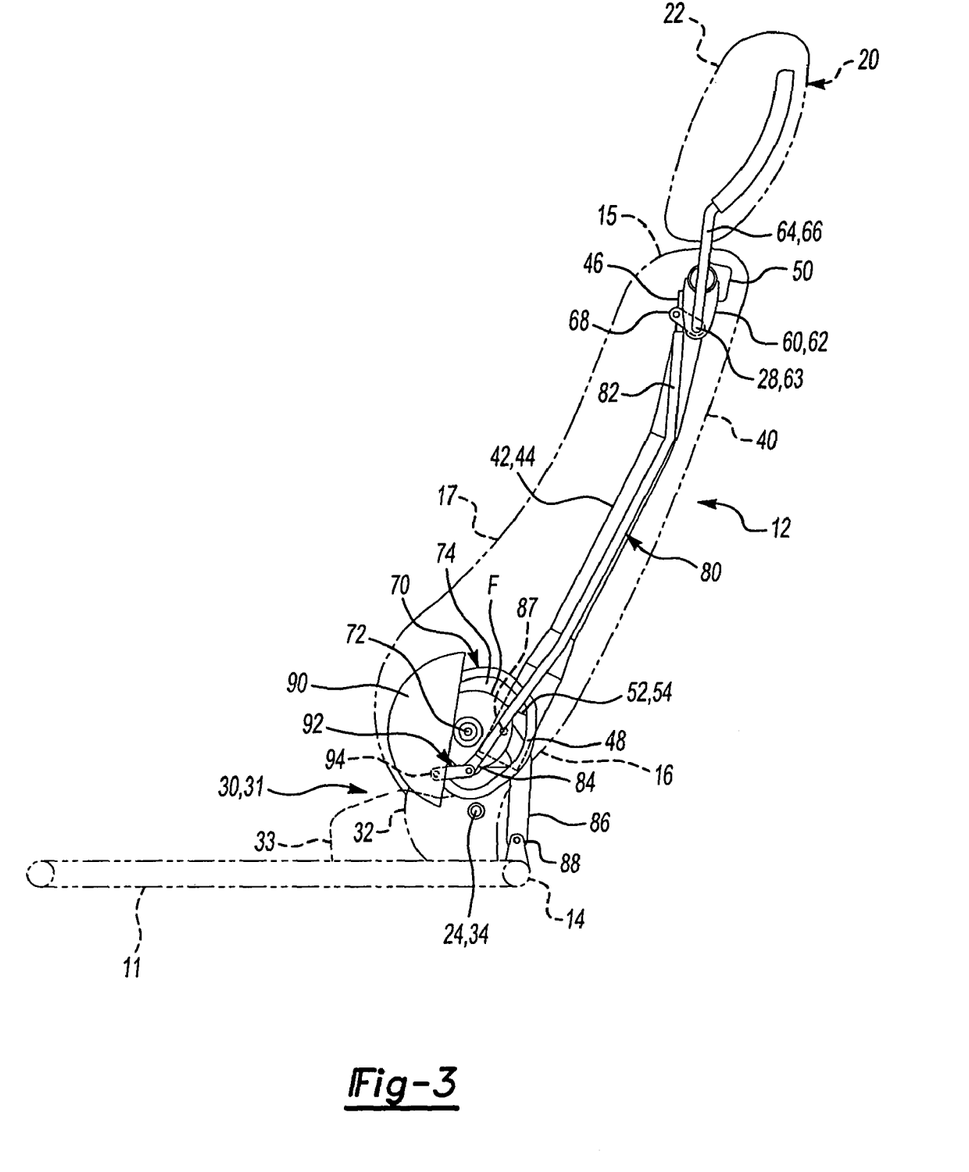
FIG. 3 is a side view of the seat assembly with a seat back in a generally upright seating position.
Figure 6:
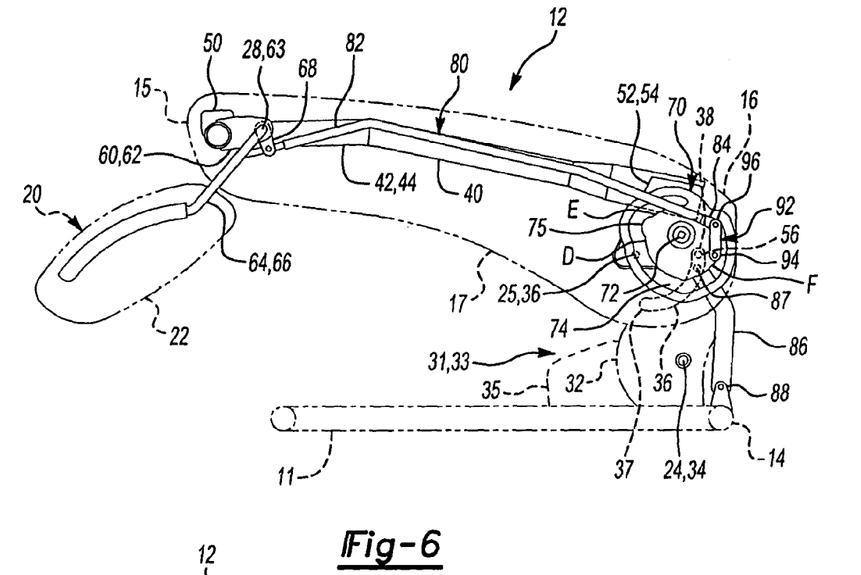
FIG. 6 is an enlarged side view of a portion of the mechanism for adjusting the angular position of the head restraint with the seat back in a forwardly folded-flat position.

Referring to FIGS. 2 and 3, the seat assembly 10 further provides a mechanism for automatically and continuously adjusting the angular disposition of the head restraint 20 about a third pivot axis 28 relative to the seat back 12 in response to pivotal movement of the seat back 12 relative to the seat cushion 11. More specifically, a pair of spaced apart pivot brackets 60, 62 are fixedly attached to the upper cross member 50. A cylindrical shaft 63 is rotatably journaled to each of the pivot brackets 60, 62 defining the third pivot axis 28. A pair of spaced apart head restraint guide posts 64, 66 extend generally upwardly from the cylindrical shaft 63 in front of the upper cross member 50 for slidably receiving the head restraint 20. An arm 68 extends radially from the cylindrical shaft 63. The head restraint 20 is pivotal relative to the seat back 12 between a plurality of head supporting positions as shown in FIG. 1 and a stowed position as shown in FIG. 6.

An eccentric cam plate 70 is rotatably connected to the first recliner bracket 52 by a pivot pin 72. A guide slot 74 is formed in the cam plate 70. A control rod 80 having upper and lower ends 82, 84 extends generally through the seat back 12 between the head restraint 20 and the cam plate 70. The upper end 82 of the rod 80 is pivotally attached to the distal end of arm 68. The lower end 84 of the rod 80 is slidably engaged with the slot 74 of the cam plate 70. A cam link 86 interconnects the cam plate 70 to the seat cushion 11. Specifically, the cam link 86 has a first end 87 pivotally assembled to the cam plate 70 and a second end 88 pivotally assembled to the rear portion 14 of the seat cushion by any suitable means, such as by a pin, rivet, or bolt. An extension bracket 90 is fixedly attached to the first recliner bracket 52. A control link 92 having first and second ends 94, 96 interconnects the lower end 84 of the rod 80 to the extension bracket 90, wherein the first end 94 is pivotally attached to the extension bracket 90 and the second end 96 is pivotally attached to the lower end 84 of the rod 80.

Referring to FIGS. 3-7, in operation, the angular position of the head restraint 20 relative to the seat back 12 is a function of the angular position of the seat back 12 relative to the seat cushion 11. That is, as the seat back 12 is pivotally reclined (in the clockwise direction as shown) from the upright seating position, shown in FIGS. 1-3, to a reclined position (towards the fully reclined position shown in FIG. 4) it is desirable to pivot the head restraint 20 relative to the seat back 12 (in the counterclockwise direction as shown) and closer to the occupant's head for further support thereof. Specifically, when the angular position of the seat back 12 relative to the seat cushion 11 is locked by the recliner mechanisms 30, 31, a corresponding angular position of the cam plate 70 relative to the seat back 12 is maintained by the cam link 86 and in turn, a corresponding position of the lower end 84 of the rod 80 within the slot 74 of the cam plate 70 is maintained by the control link 92. The control link 92 prevents the lower end 84 from sliding freely within the guide slot 74 of the cam plate 70. By this arrangement, the angular position of the head restraint 20 is a function of the angular position of the seat back 12.

Figure 4:
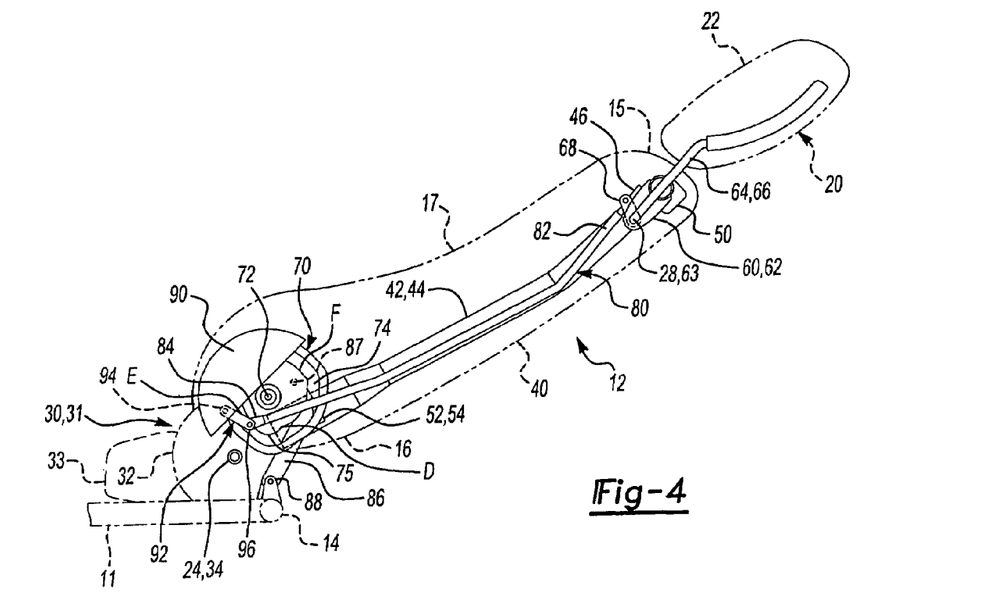
FIG. 4 is a side view of the seat assembly with the seat back in a fully reclined seating position.
Figure 5:
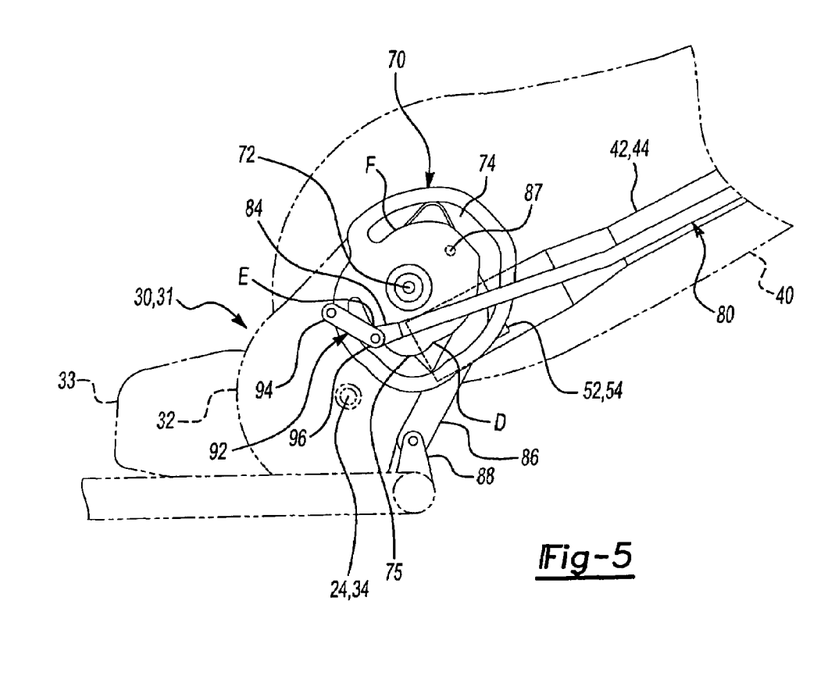
FIG. 5 is an enlarged side view of a portion of a mechanism for adjusting the angular position of the head restraint with the seat back in the fully reclined seating position.

When the seat back 12 is adjusted rearwardly, for example from a generally upright seating position, shown in FIG. 3, to a fully reclined seating position shown in FIGS. 4 and 5, the cam link 86 causes the cam plate 70 to pivot counterclockwise relative to the seat back 12 about the pivot pin 72. As best shown in FIG. 5, the control link 92, in turn, causes the lower end 84 of the rod 80 to slide generally clockwise within the slot 74 from a first position D which corresponds to the generally upright seating position to a second position E which corresponds to the fully reclined position. With the lower end 84 of the rod 80 in either the first position D or the second position E, the head restraint 20 is disposed linearly relative to the seat back 12 wherein the front surface 17 of the seat back 12 and the front surface 22 of the head restraint 20 form a generally flat, or planar, occupant supporting surface.

Figure 7:
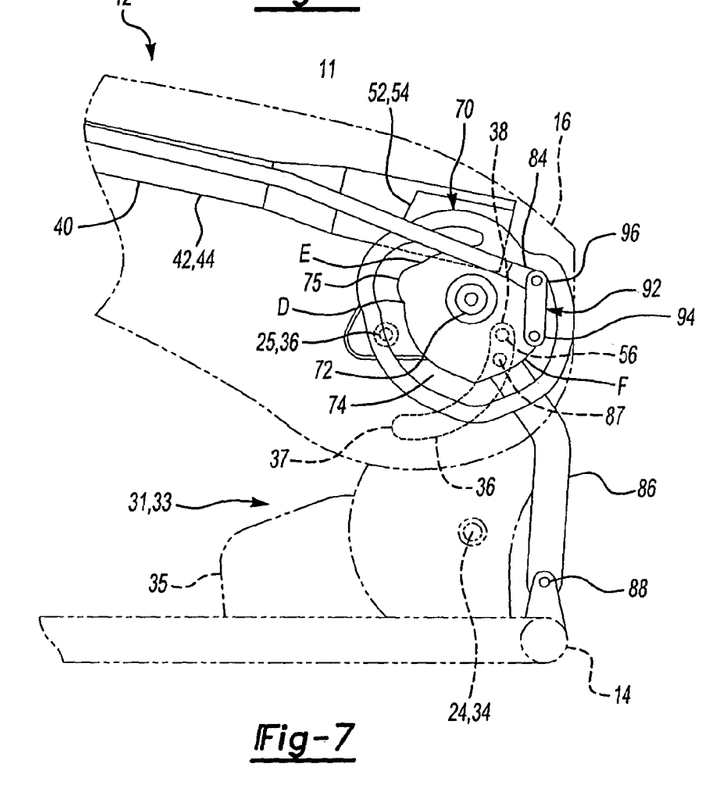
FIG. 7 is a side close-up view of the rear and lower portion of the seat assembly with the seat back in the forwardly folded-flat position.

As best viewed in FIGS. 5 and 7, the radial distance of the slot 74 from the pivot pin 72 increases between the first and second positions D, E forming a bump 75. As the seat back 12 is pivoted between the generally upright seating position and the fully reclined seating position, the lower end 84 of the rod 80 slides over the bump 75 in the slot 74 thereby causing the rod 80 to pull the head restraint 20 pivotally forward relative to the seat back 12. The forward pivoting of the head restraint 20 upon the pivoting movement of the seat back 12 from the upright seating position to any of the reclined seating positions automatically and continuously maintains the optimal angle between the head restraint 20 and seat back 12 and thus the distance to the seat occupant's head for support thereof. The opposite motion occurs when the seat back 14 is returned from the fully reclined position to the upright seating position. Therefore, the mechanism automatically and continuous adjusts and optimizes the position of the head restraint 20 relative to the seat back, and occupant's head, in response to pivotal movement of the seat back 12.

When the seat back 12 is adjusted to the forwardly folded-flat position B, shown in FIGS. 6 and 7, the cam link 86 causes the cam plate 70 to pivot clockwise relative to the seat back 12 about the pivot pin 72. In turn, the control link 92 causes the lower end 84 of the rod 80 to slide generally counterclockwise towards a portion F in the slot 74 having the greatest radial distance from the pivot pin 72. The rod 80 pulls the head restraint 20 pivotally forward, or counterclockwise as shown, relative to the seat back 12 until the head restraint 20 is disposed generally perpendicular to the seat back 12. This allows the head restraint 20 to clear any obstructions in front of the seat assembly 10 typically present in a vehicle setting, such as a dashboard or another seat.

The amount and direction of pivotal movement of the head restraint 20 obtained in response to pivotal movement of the seat back 12 can be tailored to meet the requirements of a particular seating application by modifying the dimensions and pivot locations of the cam plate 70, the cam link 86, the control link 92, and the arm 68. For example, the bump 75 in the slot 74 can be decreased or increased in its prominence relative to the first and second positions D, E to increase or decrease, respectively, the amount of forward motion of the head restraint 20 when the seat back 12 is pivoted between the generally upright seating position and the fully reclined seating position.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A seat assembly comprising:
   a seat cushion having front and rear portions;
   a seat back having upper and lower portions, said seat back operatively connected at said lower portion to said rear portion of said seat cushion for pivotal movement relative to said seat cushion between a plurality of reclined seating positions for supporting an occupant in said seat assembly, said seat back further including a front surface for supporting the back of an occupant seated on said seat assembly;
   a head restraint having a front surface for supporting the head of the occupant seated on said seat assembly, said head restraint pivotally coupled to said upper portion of said seat back and moveable relative to said seat back between a plurality of head supporting positions for supporting the head of the occupant; and
   a mechanism operatively interconnecting said head restraint to said seat back for providing automatic and continuous pivotal adjustment of said head restraint to one of said head supporting positions in response to pivotal adjustment of said seat back to one of said reclined seating positions and for providing automatic and continuous pivotal movement of said head restraint between one of said head supporting positions and a forwardly folded stowed position generally perpendicular to said seat back in response to pivotal adjustment of said seat back between one of said reclined seating positions and a forwardly folded flat position generally against said seat cushion.

2. A seat assembly as set forth in claim 1 wherein said mechanism includes a cam plate operatively coupled between said seat back and said head restraint for controlling said automatic pivotal movement of said head restraint in response to said pivotal movement of said seat back.

3. A seat assembly as set forth in claim 2 wherein said cam plate is rotatably coupled to said seat back and said mechanism includes a control rod operatively coupled between said cam plate and said head restraint for forcing said head restraint to pivot about said upper portion of said seat back in response to rotational movement of said cam plate caused by said pivotal movement of said seat back.

4. A seat assembly as set forth in claim 3 wherein said mechanism includes a cam link connected between said seat cushion and said cam plate for rotating said cam plate relative to said seat back in response to pivotal movement of said seat back relative to said seat cushion.

5. A seat assembly as set forth in claim 4 wherein said cam plate includes a contour guide slot for receiving and guiding a portion of said control rod and said pivotal movement of said head restraint in response to said rotation of said cam plate.

6. A seat assembly as set forth in claim 5 wherein said mechanism includes a control link coupled between said seat back and said control rod for controlling movement of said control rod along said guide slot during rotation of said cam plate.

* * * * *

UNITED STATES PATENT AND TRADEMARK OFFICE
CERTIFICATE OF CORRECTION

PATENT NO. : 7,344,189 B2
APPLICATION NO. : 10/380185
DATED : March 18, 2008
INVENTOR(S) : Reed et al.

It is certified that error appears in the above-identified patent and that said Letters Patent is hereby corrected as shown below:

Title Pg. Item (75) Inventors:

For the third listed inventor, Jacob Aaron Bentekoe, please correct the name to:

Jacob Aaron BONTEKOE.

Signed and Sealed this

First Day of July, 2008

JON W. DUDAS
*Director of the United States Patent and Trademark Office*